United States Patent

[11] 3,530,858

[72] Inventor John Richard Edwards
 2004 W. Yakima Ave., Yakima, Washington 98902
[21] Appl. No. 726,281
[22] Filed May 3, 1968
[45] Patented Sept. 29, 1970

[54] DISPOSABLE SYRINGE
 4 Claims, 3 Drawing Figs.
[52] U.S. Cl..................................... 128/232,
 128/247, 222/567, 128/251
[51] Int. Cl....................................... A61m 1/00
[50] Field of Search............................ 128/232,
 247, 275, 227, 251, (Bag Digest); 150/9, 10, 11; 206/63.2, 43, 17.5; 239/327, 328; 222/567, 568, 107

[56] References Cited
 UNITED STATES PATENTS
2,923,296 2/1960 Adams et al.................. 128/227
3,122,297 2/1964 Sachs........................... 229/14
3,144,866 8/1964 Ellis............................. 128/232
3,148,803 9/1964 Geyer........................... 222/567X
3,307,549 3/1967 Zackheim..................... 128/227

Primary Examiner—Richard A. Gaudet
Assistant Examiner—J. Yasko
Attorney—Dana E. Keech ABSTRACT: A disposable syringe primarily for use in feminine hygiene, which includes a rectangular 12"x3½" polyethylene bag open at one end, a flat plastic spool, a plastic nozzle threadedly received by the spool opening to make a liquid tight fit therewith, the spool being freely received within the open end of the bag, and a rubber band wrapped around the bag end to bind the same to the spool in a fluid tight connection therewith.

Patented Sept. 29, 1970 3,530,858
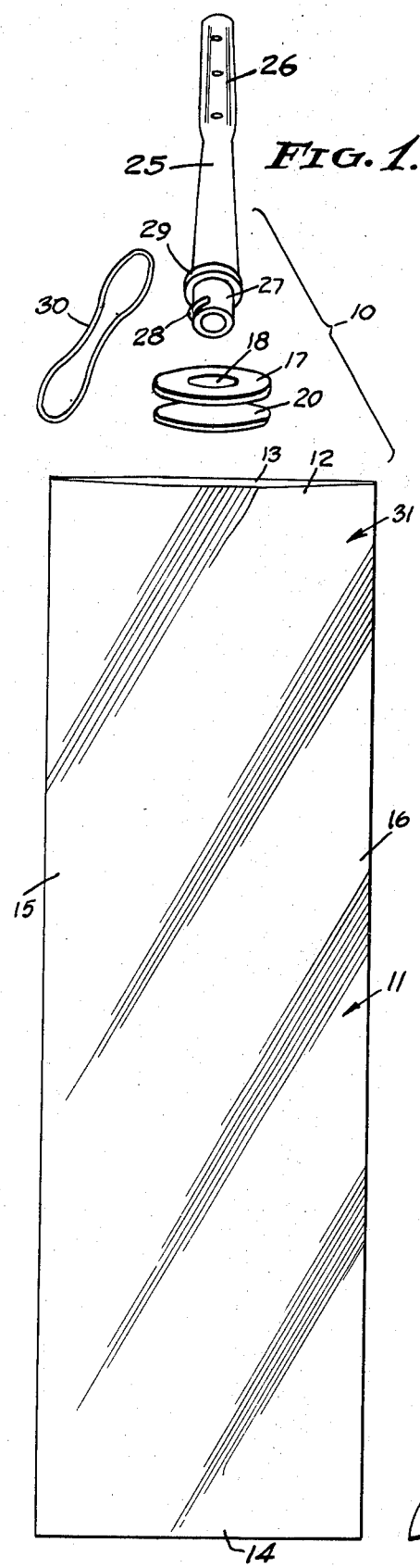
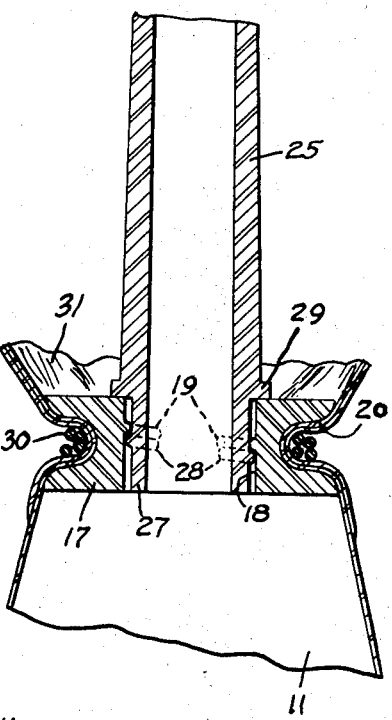
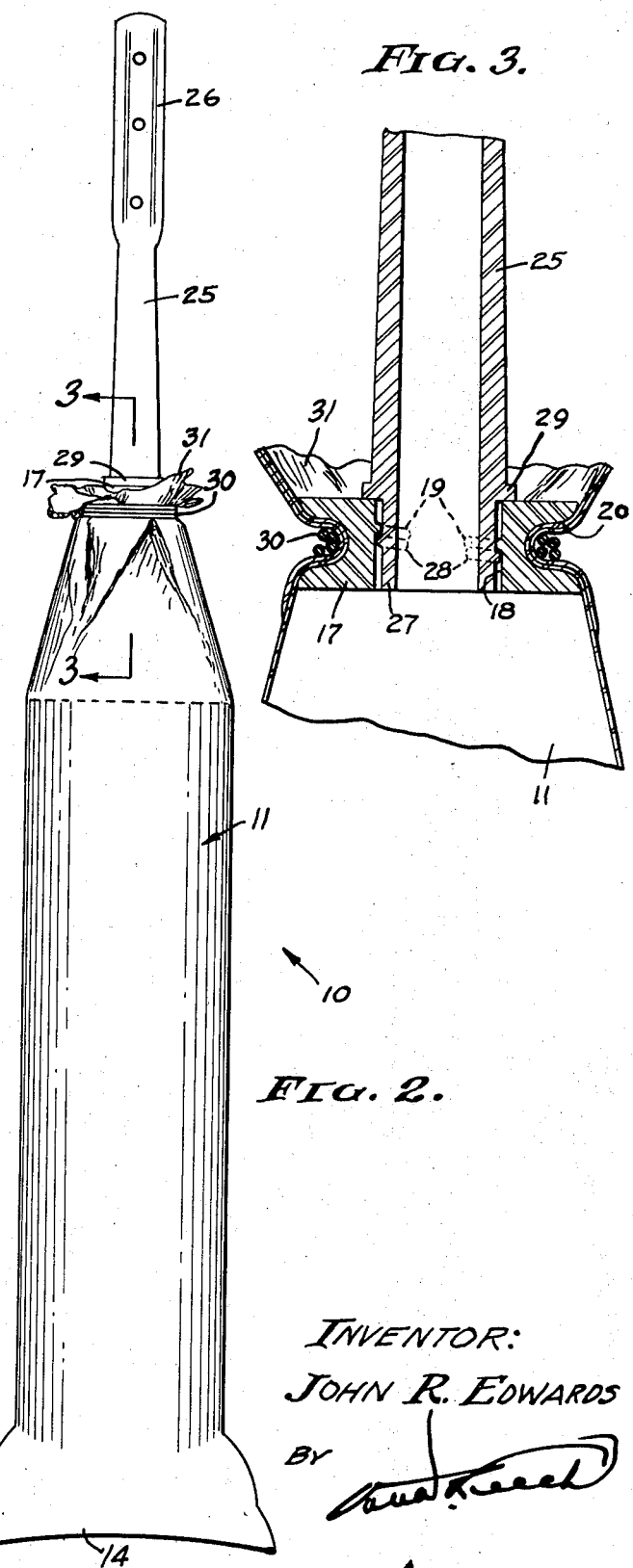
INVENTOR:
JOHN R. EDWARDS
BY
ATTORNEY

DISPOSABLE SYRINGE

BACKGROUND OF THE INVENTION

1. Field of the Invention

The provision of a syringe or kit for assembling the same which can be packed in such a small space as to fit conveniently into a handbag and which is so inexpensive that, after use, it need not be cleaned and dried for repackaging but may be disposed of in any trash dispository such as the wastebasket commonly provided in a hotel or motel room.

2. Description of the Prior Art

Patents on recent developments in this specific field include the following:

Friedman, U.S. Pat. No. 2,568,915 Sept. 25, 1951;
Kempel, U.S. Pat. No. 2,664,893 Jan. 5, 1954;
Hyatt, U.S. Pat. No. 2,811,968 Nov. 5, 1957; and
Ellis, U.S. Pat. No. 3,144,866 Aug. 18, 1964.

The closest of these is Kempel which shows a rubber bag molded to have a cruci-form section when collapsed. The open end of this bag has a beaded neck which is smaller in diameter than the lower flange of a nozzle base spool so as to snap over said flange and tightly conform to the annular groove of the spool. The nozzle penetrates the bore of the spool and makes a threaded liquid tight connection therewith thus connecting the bag with the nozzle.

The bag of Kempel is a relatively costly item to produce and largely defeats the objective of providing a very low priced syringe so that a person of moderate means can afford to dispose of it after a single use.

SUMMARY OF THE INVENTION

The present invention undertakes, by eliminating the rubber bag of the Kempel patent and adopting an extremely inexpensive but entirely satisfactory sheet polyethylene bag having the shape of a flat, relatively long and narrow rectangle, to attain the general object above pointed out of this particular field of invention.

By making this bag rectangular and long and narrow, two important unrelated objects are realized. Such a bag may be very cheaply manufactured from a folded matrix of sheet polyethylene, the folded edge of which forms the bag bottom. The narrowness of the bag makes a special shaping of the open bag end unnecessary to facilitate its attachment to the nozzle base spool as in Kempel and Friedman. In fact, the bag of the present invention is so narrow that a very good seal can be effected between the open bag end and the nozzle base spool merely by inserting the spool in the bag neck and winding an endless rubber band a few times around the spool.

BRIEF DESCRIPTION OF THE DRAWING

FIG. 1 is an exploded, perspective view of the several elements comprising the invention as these may be packaged in the form of a kit for assembly by a purchaser in completing the invention.

FIG. 2 is an elevational view of the elements shown in FIG. 1 with these assembled and with the bag of the invention filled with water to a given indicated level as when the invention is prepared for use.

FIG. 3 is an enlarged fragmentary cross-sectional view taken on the line 3—3 of FIG. 2 and illustrates the manner in which the open neck of the bag of the invention is secured to the spool-like nozzle base thereof, and also shows the manner in which the lower end of the nozzle fits into the central bore of the base and has threaded connection therewith so as to form a tight seal between the nozzle and the base.

DESCRIPTION OF THE PREFERRED EMBODIMENT

A disposable syringe 10 of the present invention is preferably shown in the drawings as comprising a relatively long and narrow rectangular flat polyethylene bag 11 which includes front and back walls 12 and 13 which are united by fold 14 in the material forming the bottom end of the bag and which are securely gathered along their side edges by weld seals 15 and 16 which are preferably produced by hot wire cutting bag 11 from one end of a folded sheet of polyethylene the folded width of which is equal to the length of said bag. The views of bag 11 and the other parts of the invention shown in FIG. 1 are drawn to scale, the dimensions of bag 11 preferably being 3½" wide and 12" long.

The invention also includes a nozzle base 17 in the form of a flat spool having a relatively large diameter and a short axial dimension, an axial bore 18 being provided therein with gun breech threads 19 which are circumferentially spaced apart in excess of 90° and located in directly opposite positions within the bore 18. The base 17 is provided with a relatively deep annular groove 20 formed in the periphery thereof.

The syringe also has a plastic spray nozzle 25 having at one end a spray head 26 and at the other end, a nipple 27 fitting loosely into the base bore 18 and co-extensive in length with said bore, and having male gun breech threads 28 and an annular external shoulder 29 which is held against the upper face of the nozzle base 17 by engagement of the threads 28 with the threads 19 of the nozzle base 17.

The disposable syringe 10 also includes a rubber band 30 which is employed in assembling the bag 11 with the nozzle base 17 in the following manner. The open end portion 31 of the polyethylene bag 11 may be referred to as the "neck" of the bag. The nozzle base 17 is adapted to be inserted axially in the bag neck 31 so as to be located about ½" inside the upper extremity of the bag. The neck of the bag is now folded around and pressed against the periphery of the nozzle base 17 and the rubber band 30 is wrapped a number of times about the bag neck so as to compress this into the annular groove 20 of the nozzle base thereby retaining the bag and nozzle base in assembled relation and making a liquid tight connection between these elements. The nozzle 25 is preferably removed from the base 17 during the application of the rubber band 30 as above described.

When preparing the syringe 10 for use, the nozzle 25 is also removed from the nozzle base 17 so that water and any other materials that it may be desired to incorporate therewith may be poured through the bore 18 into the bag. It is customary to sell disposable syringes such as the present invention with an envelope of douche powder packaged therewith and this powder may be poured into the bag before the latter is filled with liquid, following which the nipple 27 is inserted in the bore 18 of the base 17 and rotated a quarter turn to cause the threads of the nozzle and base to be engaged and press the annular external shoulder 29 of the nozzle tightly against the upper surface of the base.

After being thus prepared, the syringe 10 is used in the ordinary manner. The delivery of the liquid in the bag 11 at a suitable pressure from the spray nozzle, is accomplished by applying the hands to the bag to maintain a constant pressure thereagainst. If desired, the lower end of the bag may be rolled up as the amount of water in the bag diminishes to facilitate keeping the water in the bag under pressure until it has all been discharged through the nozzle 25.

While the syringe 10 is relatively inexpensive to manufacture and is sold at a low price, so that it can be carried in a handbag for emergency use and thereafter disposed of in any convenient refuse depository such as wastebaskets universally available in hotel or motel rooms, it is not difficult to remove the rubber band 30 which secures the bag neck to the nozzle base 17 following the use of the device and thus disassemble the syringe 10 into the units comprising the same as separately illustrated in FIG. 1. This renders it very easy to clean and dry the said elements individually after which they may be quickly replaced in the plastic bag in which they are merchandised and be made available for subsequent assembly and reuse.

I claim:

1. In a disposable syringe, the combination of:
a hard plastic feminine hygiene nozzle having a short connection nipple at one end and a spray head at its opposite end;

an annular external sealing shoulder at the juncture of said nipple with said nozzle;

male gun-breech threads on said nipple;

a flat spool-like plastic nozzle base co-extensive in length with said nipple and axially bored to loosely receive the same;

female gun-breech threads formed in said axial bore and by-passed by said male threads when misaligned therewith, the two threads being interengaged by rotating said nozzle after insertion of said nipple in said base bore to press said shoulder into sealing engagement with said base;

said nozzle base having an outside diameter over three times its axial length and being provided with a deep annular external groove embracing substantially the entire periphery of said base;

a rectangular, flat, relatively long and narrow polyethylene bag, one narrow end of which is closed while the other narrow end is completely open prior to assembly, the latter bag end portion comprising a neck with a diameter, when filled, which is greater than that of said nozzle base but not substantially greater than twice said base diameter; and rubber band means applied to said bag neck and nozzle base after said base has been inserted into said neck and the latter folded circumferentially against the periphery of said nozzle base, to compress said folded bag neck into said annular groove to accomplish a liquid tight connection between said bag neck and said base.

2. A combination as recited in claim 1 wherein said bag has the bottom thereof formed by a fold in said sheet polyethylene and the side edges of said bag are hot-cut-sealed and approximately six times as long as the diameter of said bag when the latter is filled with liquid.

3. A combination as recited in claim 1 wherein said bag when flat, measures approximately 12 inches long and 3½ inches wide.

4. A combination as recited in claim 2 wherein said bag when filled with liquid having a length approximately six times the distended diameter thereof.